(12) United States Patent
Guo et al.

(10) Patent No.: US 8,946,320 B2
(45) Date of Patent: *Feb. 3, 2015

(54) INK SYSTEM CONTAINING POLYMER BINDERS

(75) Inventors: Dennis Z. Guo, San Diego, CA (US); Xiaohe Chen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2236 days.

This patent is subject to a terminal disclaimer.

(21) Appl. No.: 11/081,047

(22) Filed: Mar. 14, 2005

(65) Prior Publication Data

US 2005/0206703 A1 Sep. 22, 2005

(51) Int. Cl.
| | | |
|---|---|---|
| *B05D 1/32* | (2006.01) |
| *B41J 2/01* | (2006.01) |
| *B41J 2/17* | (2006.01) |
| *C08F 222/40* | (2006.01) |
| *C08L 37/00* | (2006.01) |
| *C08L 39/00* | (2006.01) |
| *C09D 5/00* | (2006.01) |
| *C09D 11/00* | (2014.01) |
| *G01D 11/00* | (2006.01) |
| *C09D 11/30* | (2014.01) |
| *C09D 11/38* | (2014.01) |
| *C09D 11/324* | (2014.01) |
| *C09D 11/322* | (2014.01) |

(52) U.S. Cl.
CPC .............. *C09D 11/322* (2013.01); *C09D 11/30* (2013.01); *C09D 11/38* (2013.01); *C09D 11/324* (2013.01)
USPC ................. 523/160; 347/1; 347/95; 347/100; 427/466; 523/161; 524/548

(58) Field of Classification Search
USPC ......... 523/160, 161; 524/548; 347/1, 95, 100; 427/466
See application file for complete search history.

(56) References Cited

U.S. PATENT DOCUMENTS

| | | |
|---|---|---|
| 4,968,616 A | 11/1990 | Inoue et al. |
| 5,035,968 A | 7/1991 | Horie et al. |
| 5,064,699 A | 11/1991 | Havens et al. |
| 5,578,141 A | 11/1996 | Mori et al. |
| 5,883,157 A | 3/1999 | Yamashita et al. |
| 5,952,401 A | 9/1999 | Kimura et al. |
| 6,056,814 A | 5/2000 | Kato et al. |
| 6,291,267 B1 | 9/2001 | Dore et al. |
| 6,300,391 B2 | 10/2001 | Parazak et al. |
| 6,506,239 B1 | 1/2003 | Osumi et al. |
| 6,740,689 B1 | 5/2004 | Lee et al. |
| 2003/0181589 A1 | 9/2003 | Brinkman |
| 2003/0217672 A1* | 11/2003 | Palumbo ....................... 106/473 |
| 2003/0232956 A1 | 12/2003 | Brinkman |

FOREIGN PATENT DOCUMENTS

| | | |
|---|---|---|
| EP | 1 376 284 A | 7/1990 |
| EP | 0735120 A2 | 10/1996 |
| FR | 02693109 | 7/1994 |
| JP | 01193378 | 8/1989 |
| JP | 02047661 | 2/1990 |
| JP | 03166275 | 7/1991 |
| JP | 05121863 | 5/1993 |
| JP | 05311105 | 11/1993 |
| JP | 06053631 | 2/1994 |
| JP | 07115258 | 5/1995 |
| JP | 08134396 | 5/1996 |
| JP | 08151544 | 6/1996 |
| JP | 08157329 | 6/1996 |
| JP | 8-269379 A | 10/1996 |
| JP | 11071544 | 3/1999 |
| JP | 11228857 | 8/1999 |
| JP | 2000095990 | 4/2000 |
| JP | 2002-332432 A | 11/2002 |
| JP | 2002-338861 A | 11/2002 |
| JP | 2003-41172 A | 2/2003 |
| JP | 2004-262081 A | 9/2004 |
| JP | 2005-264080 A | 9/2005 |
| WO | WO01/55050 A1 | 8/2001 |

* cited by examiner

*Primary Examiner* — Patrick Niland

(57) ABSTRACT

An ink-jet ink composition includes a jettable vehicle, a plurality of pigment solids dispersed in the jettable vehicle, and a half-ester of styrene maleic anhydride (SMA) dispersed in the jettable vehicle.

27 Claims, 5 Drawing Sheets

INK SYSTEM CONTAINING POLYMER BINDERS

RELATED APPLICATION

The present application is related to co-pending U.S. patent application Ser. No. 10/807,025, filed Mar. 22, 2004, which application is incorporated herein by reference in its entirety.

BACKGROUND

Ink-jet printing has become a popular way of recording images on various media surfaces, particularly paper, for a number of reasons, including, low printer noise, capability of high-speed recording, and multi-color recording. Additionally, these advantages of ink-jet printing can be obtained at a relatively low price to consumers. Though there has been great improvement in ink-jet printing, improvements are followed by increased demands from consumers for higher speeds, higher resolution, full color image formation, increased stability, etc.

As new ink-jet inks and print engines are developed, several traditional characteristics are considered when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. The long term reliability without material degradation or nozzle clogging becomes even more important with the advent of print engines that eject smaller drop volumes. Though the above list of characteristics provides an illustration of factors to be optimized for improved ink-jet printing, there are challenges associated with satisfying all of the above characteristics. Often, the inclusion of an ink component meant to satisfy one of the above characteristics can prevent another characteristic from being met. Thus, traditional commercial inks for use in ink-jet printers represent a compromise in an attempt to achieve at least an adequate response in meeting all of the above listed characteristics.

Typically dry time performance of an inkjet ink has been controlled with low molecular weight ink additives such as surfactants, penetrants, or volatile ink vehicle components. Other solutions include reducing pigment load or ink flux. However, many of these techniques often result in low optical density (OD) on printed media, poor print quality such as edge acuity, mottle, and/or complicated print mode design.

SUMMARY

In one aspect of the present system and method, an ink-jet ink composition includes a jettable vehicle, a plurality of pigment solids dispersed in the jettable vehicle, and a salt form of a half-ester of styrene maleic anhydride (SMA) dispersed in the jettable vehicle.

In another embodiment, a system for printing images on a substrate includes a jettable ink, and a printhead loaded with the jettable ink, wherein the jettable ink includes a jettable vehicle, the vehicle including water, a plurality of pigment solids self-dispersed in the jettable vehicle, a salt form of a half-ester of styrene maleic anhydride (SMA) dispersed in the jettable vehicle.

BRIEF DESCRIPTION OF THE DRAWINGS

The accompanying drawing illustrates various embodiments of the present invention and is a part of the specification. The illustrated embodiments are merely examples of the present invention and do not limit the scope of the invention.

Throughout the drawing, identical reference numbers designate similar, but not necessarily identical, elements.

DETAILED DESCRIPTION

Figure 1:
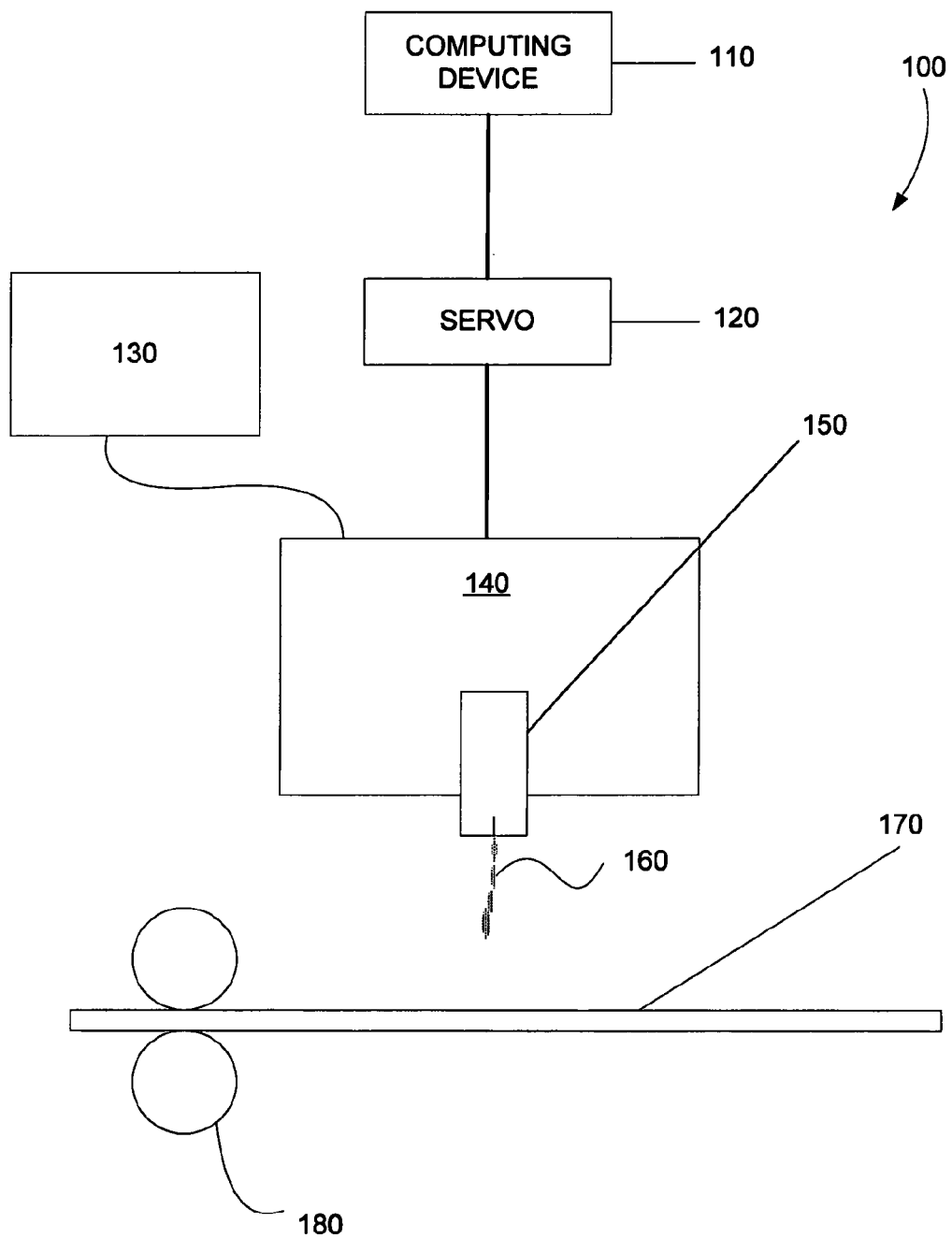
FIG. 1 is a simple block diagram illustrating an ink-jet material dispensing system, according to one exemplary embodiment.

The present specification discloses an inkjet ink system that contains at least one self-dispersed black pigment, at least one polymer binder, and may include a set of dye based color inks. Specifically the present exemplary inkjet ink system includes a polymer binder that is a half-ester of styrene maleic anhydride (SMA). According to one exemplary embodiment disclosed herein, the ester contains a butoxyethyl group. The disclosed ink system has excellent TIJ printability and combined advantages of improved dry time, high optical density, black to color bleed/halo performance on porous plain paper, without under- or over-printing with any fixer fluids or reactive inks. Further details of the present inkjet ink system will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

As used in the present specification and in the appended claims, the term "liquid vehicle" is defined to include liquid compositions that can be used to carry colorants, including pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "pigment" refers to a colorant particle which is typically substantially insoluble in the liquid vehicle in which it is used.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein, "bleed" refers to the tendency of ink to run into and mix with adjacently printed inks. Bleed typically occurs prior to the printed inks fully drying on a substrate. The degree of bleed will depend on a variety of factors such as the drying speed of the ink, agglomeration of the colorant, and ink chemistry in general, among other variables. Additionally, as used here, the term "halo" is meant to be understood as a depletion of black near a border of black and color area fills. Halo is caused by the black ink or pigment being repelled by the color ink. Further, the term "decap" is meant to be understood both here and in the appended claims as referring to the ability of an ink-jet ink to remain fluid upon exposure to air. During inkjet printing, the printhead is left uncapped, water in the ink vehicle evaporates leading to a reduced stability of ink components in the orifice. This condition may result in poor drop ejection and print defect. The nozzle degradation is well known in the art and often referred as "decap". The print defect may be corrected in many different ways including spitting drops of the ink. An indicator of the decap performance of an inkjet ink is the numbers of spitting that are required to eliminate the defect due to decap, or "number of spits to recovery", when the ink is exposed to the air for a certain period of time. When comparing two inks, one with a smaller "number of spits to recovery" is considered to have a better decap performance.

In the following description, for purposes of explanation, numerous specific details are set forth in order to provide a thorough understanding of the present system and method for an inkjet ink system that contains at least one self-dispersed black pigment, at least one polymer binder, and a set of dye based color inks. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary system (100) that may be used to apply a pigment-based ink-jet ink (160) to an ink receiving medium (170) according to one exemplary embodiment. As shown in FIG. 1, the present system includes a computing device (110) controllably coupled through a servo mechanism (120) to a moveable carriage (140) having an ink-jet dispenser (150) disposed thereon. A material reservoir (130) is also coupled to the moveable carriage (140), and consequently to the ink-jet print head (150). A number of rollers (180) are located adjacent to the ink-jet dispenser (150) configured to selectively position an ink receiving medium (170). While the present exemplary system (100) is described in the context of applying a pigment-based ink-jet ink (160) onto an ink receiving medium (170), the present system and method may be used to mark any number of items with the present pigment-based ink-jet ink. The above-mentioned components of the present exemplary system (100) will now be described in further detail below.

The computing device (110) that is controllably coupled to the servo mechanism (120), as shown in FIG. 1, controls the selective deposition of a pigment-based ink-jet ink (160) on an ink receiving medium (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and ink-jet dispenser (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of ink-jet material dispensers (150) configured to dispense the present pigment-based ink-jet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct one or more of the ink-jet dispensers (150) to selectively dispense a pigment-based ink-jet ink at predetermined locations on the ink receiving medium (170) as digitally addressed drops, thereby forming the desired image or text. The ink-jet material dispensers (150) used by the present printing system (100) may be any type of ink-jet dispenser configured to perform the present method including, but in no way limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, etc.

The material reservoir (130) that is fluidly coupled to the ink-jet material dispenser (150) houses the present pigment-based ink-jet ink (160) prior to printing. The material reservoir may be any container configured to hermetically seal the pigment-based ink-jet ink (160) prior to printing and may be constructed of any number of materials including, but in no way limited to metals, plastics, composites, or ceramics. As illustrated in FIG. 1, the material reservoir (130) may be separate from, yet fluidly coupled to the ink-jet material dispenser (150). Alternatively, the material reservoir (130) may be directly coupled to and form a part of the ink-jet material dispenser (150).

FIG. 1 also illustrates the components of the present system that facilitate reception of the pigment-based ink-jet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or positionally secure the ink receiving medium (170) during a printing operation, as is well known in the art.

The present system and methods provide ink-jet inks that have fast dry time and high print quality on plain paper, e.g., high optical density, reduced bleed, maintained good printability and system reliability, reduced misdirected firing and etc. The formation and composition of the pigment-based ink-jet ink (160) will now be described in detail below.

Exemplary Composition

The present exemplary pigment-based ink-jet ink (160) that is to be incorporated into the present inkjet ink system contains a self-dispersed black pigment, a polymer binder, a typical ink vehicle, and dye based color TIJ inks. As a result of the present formulation, the disclosed ink system has excellent TIJ printability and combined advantages of improved dry time, high optical density, and excellent black to color bleed/halo performance on porous plain paper, all without under- or over-printing with any fixer fluids or reactive inks. Additionally, other components can also be present including, but in no way limited to, salts, surfactants, biocides, buffers, viscosity modifiers, sequestering agents, stabilizing agents, polymers, UV curable materials, plasticizers, etc. The individual components of the present exemplary inkjet ink system will be described in further detail below.

Self-Dispersed Pigment

As mentioned previously, the present ink-jet ink (160) contains a self-dispersed pigment. As used herein, the term "self-dispersed pigment" is meant to be understood broadly as any pigment that can be dispersed in a liquid vehicle without the aid of dispersion. A "self-dispersed pigment" is typically a pigment whose surface has been chemically modified to make it dispersible in a liquid vehicle. These chemical modifications may include surface oxidation and surface attachments with small molecules or polymers that contain chargeable groups. The self-dispersed pigment can be of any color used in the ink-jet arts. Though any color can be used, black carbon pigments are described in an exemplary manner to favorably set forth certain principles of the present system and method.

The base carbon of the self-dispersed black pigment can be almost any available carbon pigment that provides acceptable optical density and print characteristics. Base carbon pigments suitable for use in the present system and method include, but are in no way limited to, carbon black, graphite, vitreous carbon, charcoal, and combinations thereof. In one aspect of the present system and method, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, but are in no way limited to, Cabot pigments such as MONARCH 1400, MONARCH 1300, MONARCH 1100, MONARCH 1000, MONARCH 900, MONARCH 880, MONARCH 800, MONARCH 700; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont.

Among the acceptable self-dispersed black pigments, some are commercially available. Acceptable commercially available self-dispersed black pigments include, but are in no way limited to, CAB-O-JET 200, and CAB-O-JET 300.

Typically the carbon black pigments of the present system and method can be from approximately 5 nm to approximately 10 μm and in one aspect can be from 10 nm to about 500 nm in size, although sizes outside this range can be used if the pigment can remain dispersed and provide adequate color properties. In one detailed aspect of the present system and method, the pigment load in the exemplary inkjet ink system is selected such that a reasonably high optical density (OD) and a good print quality can be achieved. According to one exemplary embodiment, the pigment load for the disclosed black ink system ranges from approximately 1 to 10% of the ink by weight. According to another exemplary embodiment, the pigment load ranges from approximately 2 to approximately 5% by weight.

While black pigments are described in some detail above, other pigment colors can also be used by the present system and method. For example, other pigments that can be used include, but are in no way limited to, color pigments from Cabot, such as CAB-O-JET 250C, CAB-O-JET 260M, and CAB-O-JET 270Y.

Polymeric Binder

In an additional exemplary aspect of the present system and method, binders can be included which act to modify ink properties to improve print attributes. Binders suitable for use in the present system and method typically have a molecular weight of from about 300 to about 50,000 g/mole. Non-limiting examples include: styrene maleic anhydride copolymers, styrene acrylic copolymers, polyester, polyester-melanine, polyvinylpyrrolidinone, polyethylene glycols and ethers thereof, polysulfones, polyamide, polyvinyl ethers, polyethylene oxides, styrene-acrylimide copolymers and salts thereof, dimethylamino diethyl acrylates, copolymers of dialkylamino ethyl acrylates and methacrylates with styrene or vinyl ethers, styrene-maleimide copolymers and salts thereof, styrene-maleamic acid-alkyl acrylate copolymers and salts thereof, vinyl naphthalene-copolymers with acrylimide or acrylamide and salts thereof, vinyl napthalend-maleimide copolymers and salts thereof, vinyl naphthalene-maleamic acid copolymers, and salts thereof. If the binder is in a particulate dispersed form, then it is not considered to be part of the liquid vehicle, but is considered to be carried by liquid vehicle.

As mentioned above, one exemplary embodiment of the present ink-jet ink includes a polymeric binder configured to reduce dry time of the ink-jet ink while maintaining good optical density of the resulting ink-jet ink. According to one exemplary embodiment, the polymeric binder is a half-ester of a styrene maleic anhydride (SMA) resin. As used herein, and in the appended claims, the term "SMA" will be used interchangeably with any styrene maleic copolymer. "SMA" is also a trade name for commercial styrene maleic copolymers from the Sartomer Company.

Formula 1 below illustrates an SMA base resin. As illustrated in Formula 1 below, the SMA base resin results as a combination of one or more styrene molecules being combined with a maleic anhydride molecule.

Formula 1

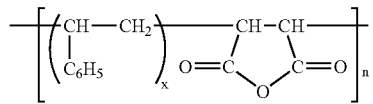

According to the present exemplary embodiment, the half-ester of a styrene maleic anhydride resin is prepared by partial esterification of an SMA base resin. In other words, the half-ester of a styrene maleic anhydride is synthesized by reacting an alcohol with the SMA base resin to form the ester linkages. As illustrated below in Formula 2, the half-ester of a styrene maleic anhydride resin contains a combination of anhydride and mono-ester/mono carboxylic acid functionality. The half-ester of SMA exhibit generally low melting viscosities, reactivity typical of the carboxylic acid functionality, improved solubility in many organic solvents and refined polymeric surfactant properties, including generally better compatibility with other polymeric and non-polymeric surfactants.

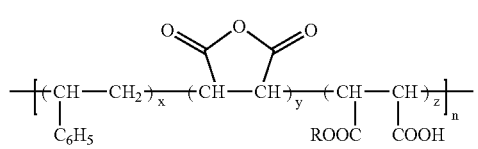

Formula 2

As illustrated in Formula 2, the half-ester of SMA may vary in the number and arrangement of the molecule components.

In one exemplary embodiment, R is an alkyl, phenyl, alkyl-substituted phenyl, cycloalkyl, ether or mixture thereof.

In another exemplary embodiment, R is a butoxyethyl group.

In yet another exemplary embodiment, R is a propyl group.

In still another exemplary embodiment, "x" may vary from 1 to 25, "y" may vary from 0.1 to 9, "z" may vary from 0.1 to 9, and "n" may vary from approximately 1 to 25.

According to another exemplary embodiment, "x" may vary from 2 to 10, "y" may vary from 0.10 to 2, "z" may vary from 0.10 to 2, and "n" may vary from approximately 2 to 10.

A number of half-esters of SMA are commercially available as solids and/or powder forms and can be converted into an aqueous solution with a base. Available commercial grades of half-esters of SMA include, but are in no way limited to, SMA 1440, 17352, 2625, 3840, and 31890. SMA 1440 and 2625 are half-esters of SMA with 2-butoxyl ethanol and propyl alcohol respectively. The commercial grades of half-esters of SMA were tested and compared as will be discussed in further detail below.

In addition to the above-mentioned half-esters of SMA, the polymeric binder may be pretreated with a base to produce the salt form thereof to help the dissolution of the binder in aqueous vehicles, such as those used in the present exemplary embodiment. The base treatment would lead to the breakage of the anhydride moiety and the neutralization of the carboxylic acid groups. For application in solvent-based inks, or in a vehicle with low water content, the half-ester of SMA may be used directly without any pretreatment. The bases for neutralizing half-esters of SMA include, but are in no way limited to, hydroxide of alkaline metals and tetraalkylammonium, carbonate or bicarbonate of alkaline metals, and organic amines. A mixture of bases may also be used. Alternatively, the half-ester of SMA may be added into and dissolve in a liquid vehicle containing one or more of the aforementioned bases, also leading to the breakage of the anhydride moiety. According to one exemplary embodiment, the salt form of the half-ester of SMA is formed by combining the anionic polymer half-ester of SMA with a positively charged counterion such as an ammonium ion (NH4+), lithium ions (Li+), sodium ions (Na+), potassium ions (K+), rubidium ions (Rb+), cesium ions (Cs+), and the like.

According to one exemplary embodiment, the concentration of the half-ester of SMA in the disclosed pigmented black ink is from approximately 0.05% to 10% by weight based on the acidic anhydride form of half-ester of SMA. Furthermore a concentration of the disclosed SMA binder may range from 0.1 to 5%.

Ink Vehicle

Additionally, the present ink-jet ink includes an Ink vehicle. According to one exemplary embodiment, the ink vehicle may contain water and organic co-solvents, surfactants, buffers, and/or other functional additives to form a liquid vehicle.

The ink-jet ink compositions of the present system and method are typically prepared using an aqueous formulation or liquid vehicle which can include water, co-solvents, surfactants, buffering agents, biocides, sequestering agents, viscosity modifiers, humectants, and/or other known additives. Additionally, binders and solids can be present in the ink vehicle, such as pigment solids and other polymeric solids. In one exemplary aspect of the present system and method, the liquid vehicle can comprise from approximately 70 wt % to about 99 wt % of the ink-jet ink composition.

As described previously, a liquid vehicle can be used to carry the pigment dispersions and the polymeric binder, as well as other solids that may be present in the ink-jet ink compositions of the present exemplary system and method. More specifically, the liquid vehicle can include water, and from 5 wt % to 35 wt % total organic solvent content, along with other optional liquid components.

With respect to the co-solvent content, co-solvents for use in the present system and method include, but are in no way limited to, aliphatic alcohols, aromatic alcohols, diols, glycols, imidazoles, pyrrolidinones, glycol ethers, poly(glycol) ethers, glycerine, ethers, esters, organosulfoxides, sulfones, alcohol derivatives, cellosolve, ether derivatives, amino alcohols, and/or ketones. For example, co-solvents can include, but are in no way limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides.

Specific examples of co-solvents that may be employed in the practice of the present system and method include, but are not limited to, 1,5-pentanediol, 2-pyrrolidone, propylene glycol n-butyl ether, Liponic ethylene glycol 1, Liponic ethylene glycol 7, 2-methyl-2,4-pentanediol, 2-methyl-1,3-propanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or modify other properties of the ink such as viscosity, pH, surface tension, optical density, and print quality, among others.

Various buffering agents can also be optionally used in the ink-jet ink compositions of the present system and method. Typical buffering agents may include, but are in no way limit to, organic-based "biological buffers" that have been widely used in chemical and biological sciences or inorganic buffers. Further, the buffers employed should provide a pH ranging from about 6 to about 10 in the practice of the present system and method, preferably about 7.5 to about 9.5. If used, buffering agents typically comprise less than approximately 10 wt % of the ink-jet ink composition.

In another exemplary aspect of the present system and method, various biocides can be used to inhibit growth of undesirable microorganisms. Several examples of suitable biocides include, but are in no way limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

Traditionally, surfactants have been added to TIJ inks for a number of reasons. For example, surfactants may be added to TIJ inks to modify the properties of the ink at an interface including, but in no way limited to, improving wetting qualities, suspending particles, controlling foam, and/or modifying viscosity. However, the inclusion of traditional levels of surfactants often resulted in low optical density on the printed media, undesirable firing frequencies response, poor print quality, and environmental impact issues. However, due to the superior performance of the above-mentioned half-ester of SMA polymer binder, the surfactant portion of the ink-jet ink is used at a significantly reduced level or even eliminated in the disclosed black pigmented ink, as compared to traditional TIJ inks. This reduction in surfactants generally leads to relatively improved environmental impact, better material capability, and enhanced print reliability.

Color Inks

In addition to the above-mentioned components of the present ink-jet ink, the present ink-jet ink may also include any number of color inks. As a result of the disclosed half-ester of SMA binders in the black ink formulation, excellent black to color bleed and halo performance are achieved even though the color inks contain a reduced amount of or no reactive agents. The reduction of these reactive chemicals in the color inks improves the environmental impact, enhances printing reliability and performance, and provides more formulation flexibility for the color inks.

EXAMPLE

The following example illustrates the embodiments of the system and method that are presently best known. However, it is to be understood that the following is only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements. Thus, while the present system and method has been described above with particularity, the following example provides further detail in connection with what is presently deemed to be the most practical and preferred embodiments of the present system and method.

According to the present example, a set of inks was formulated using the components illustrated in Table 1 below. The inks contain 0 and approximately 0.8% SMA base resins or SMA half esters.

TABLE 1

| COMPONENT | WT % |
|---|---|
| Self-Dispersed Pigment | 4.0 |
| 2-Pyrrolidone | 7.0 |
| LEG-1 | 3.0 |
| Dantocol DHE | 5.0 |
| BICINE | 0.20 |
| Zonyl FSO (as is) | 0.00750 |
| SMA or SMA half ester | 0.8 |
| water | Balance |

According to the present example, the SMA base resins or SMA half esters illustrated in Table 2 were incorporated into the ink formulation shown in Table 1. Table 2 also illustrates the SMA base resins or SMA half esters' molecular weight and acid number.

TABLE 2

| COMPONENT | MW | Acid Number |
|---|---|---|
| SMA 1000 | 5500 | 480 |
| SMA 1440 | 7000 | 185 |
| SMA 2625 | 9000 | 220 |

When incorporated into the above-mentioned ink formulation, the SMAs behaved like a surfactant reducing the surface tension of the ink. The half esters of SMA, i.e., SMA 1440 and SMA 2625, are even more effective than their base resins.

Once the ink formulations were prepared, they were loaded into thermal inkjet pens and flying decap prints were performed to measure the number of "spits" to recovery, bleed prints were performed, dry time and optical density/durability prints were carried out at 8 drops per 300 dpi, and dry time measurements were performed with a tracking roller and smudging finger at 5, 7, and 9 seconds after printing. For the above-mentioned tests, up to five different plain media were used and the following results were reported as averages.

Figure 2:
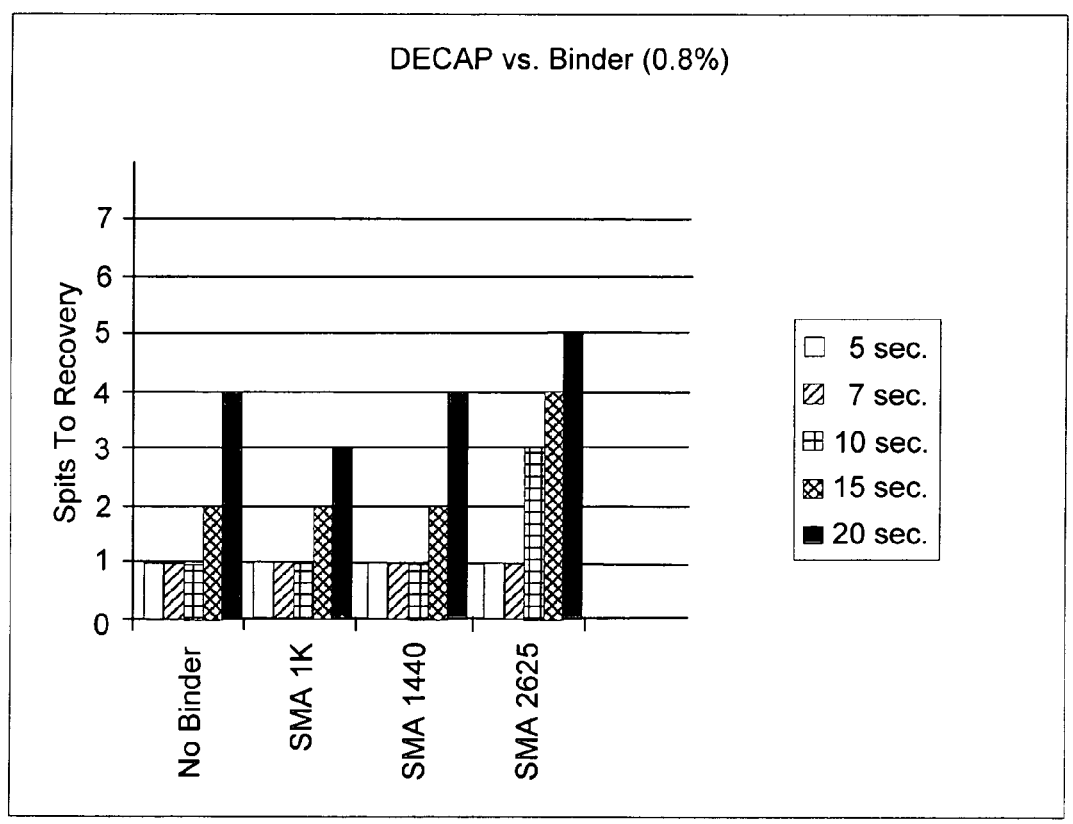
FIG. 2 is a bar graph illustrating decap test results for a number of ink formulations, according to one exemplary embodiment.

FIG. 2 illustrates the results of the decap prints. Compared with the control ink (no binder), addition of SMA 1440 and SMA 1000 polymer binders did not break down decap performance.

Figure 3:
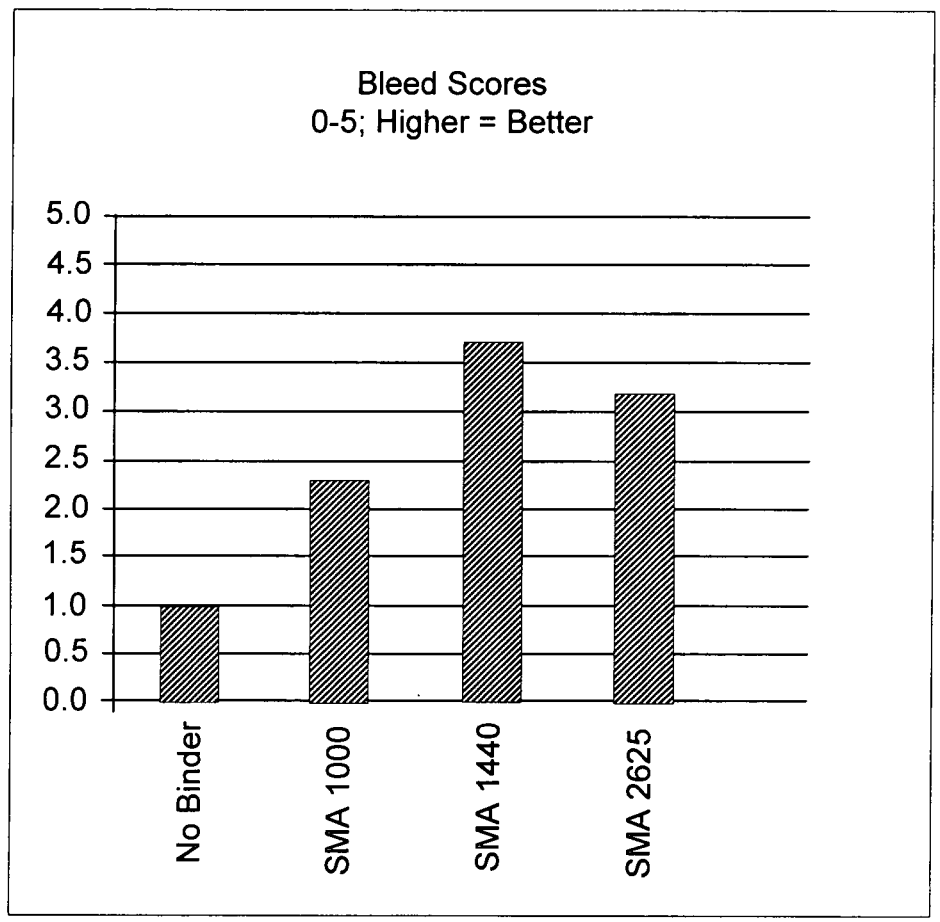
FIG. 3 is a bar graph illustrating bleed score test results for a number of ink formulations, according to one exemplary embodiment.
Figure 4:
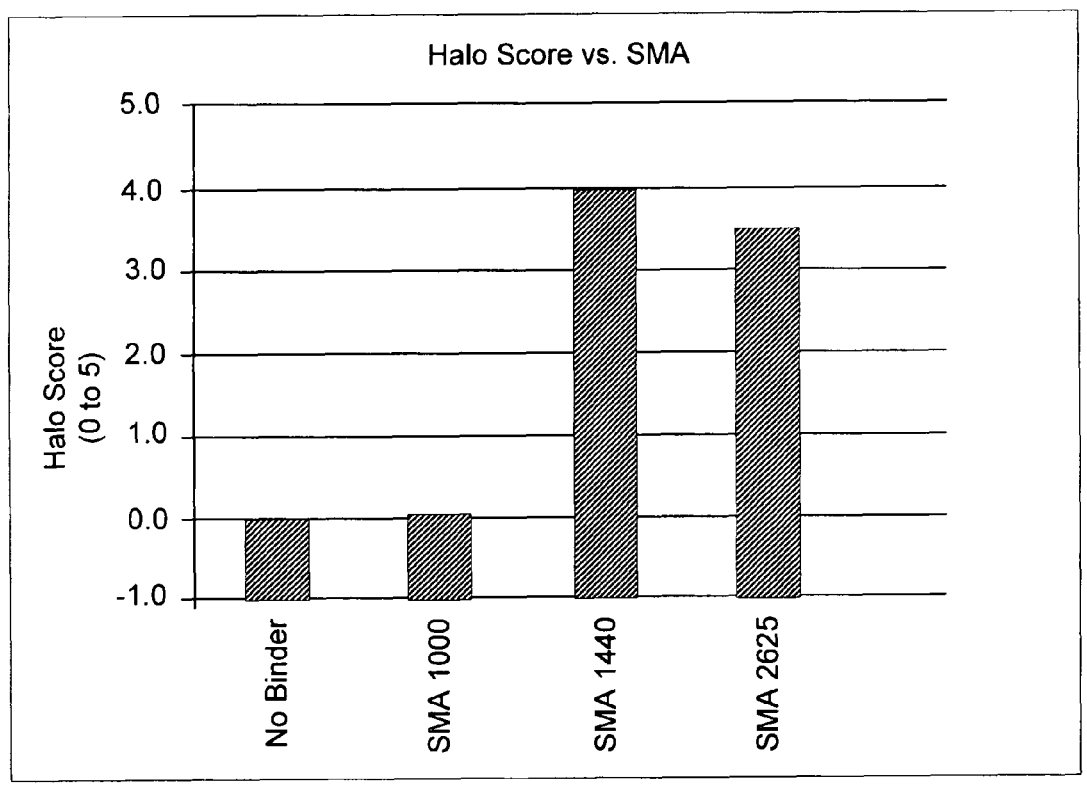
FIG. 4 is a bar graph illustrating halo performance test results for a number of ink formulations, according to one exemplary embodiment.

FIGS. 3 and 4 graphically illustrate the results of the above-mentioned bleed and halo print tests for inks containing approximately 0.8% binder. As illustrated in FIGS. 3 and 4, the scores are graded in a scale of 0-5 with 0 the worst and 5 the best. Compared with the control ink, all SMA/half ester-containing inks exhibited greatly improved bleed and halo. The SMA half esters normally had a much better bleed and halo score than an SMA base resin.

Figure 5:
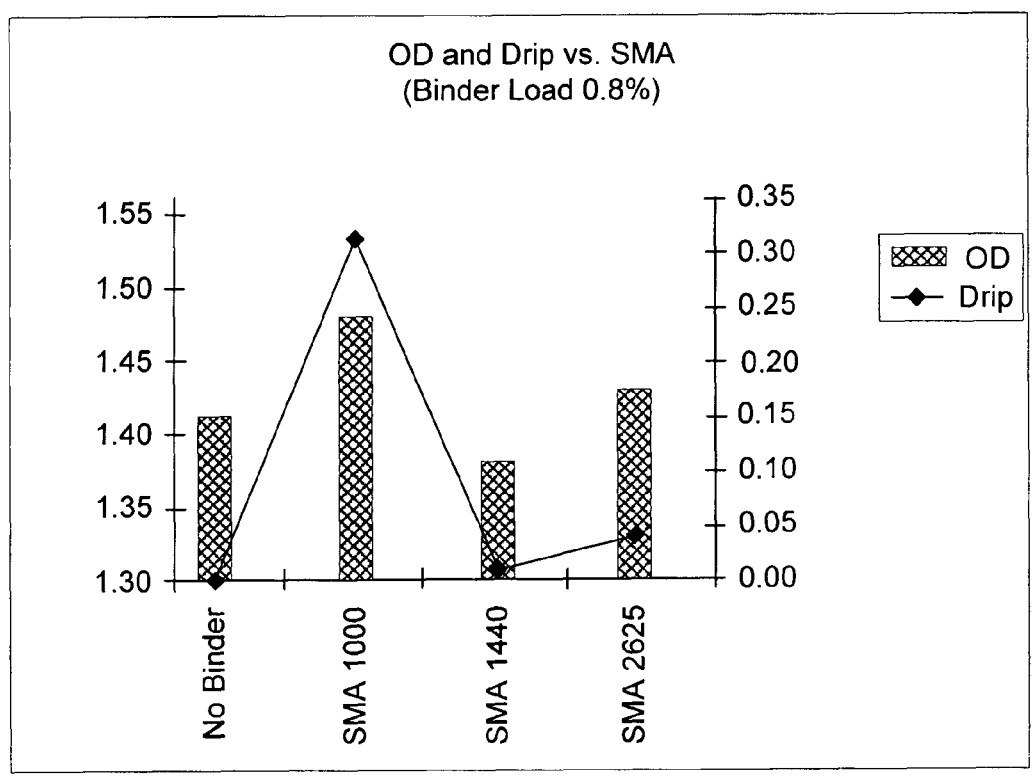
FIG. 5 is a bar graph illustrating optical density and durability test results for a number of ink formulations, according to one exemplary embodiment.

FIG. 5 illustrates the optical density performance of the test inks. Additionally, the waterfastness performance of the test inks is illustrated in FIG. 5. The results illustrated in FIG. 5 indicate that while SMA 1000 gives a higher OD than the control ink, its durability performance, measured as waterfastness, is poor. The half-esters (SMA 1440 and SMA 2625) give OD similar to the control and acceptable waterfastness (<0.05).

Table 3 below lists dry times for the above-mentioned inks containing approximately 0.8% SMA and SMA half esters. Similar to the bleed scores, the addition of SMA half esters significantly improves dry times.

TABLE 3

| SMA TYPE | Dry Time (sec.) |
|---|---|
| No Binder | 20 |
| SMA 1000 | 20 |
| SMA 1440 | 9 |
| SMA 2625 | 9 |

In conclusion, the above-mentioned example illustrates a number of benefits that may be provided by the present exemplary system and method, according to one exemplary embodiment. More specifically, the disclosed pigmented black inkjet ink has an improved dry time while maintaining high optical density and good print quality on porous plain paper. Additionally, the disclosed pigmented black inkjet ink has excellent printability, firing performance, and reliability in a thermal inkjet pen. The disclosed SMA polymer also allows formulation flexibility of using reduced amount of or no surfactants or penetrating agents in the pigmented black ink, thereby reducing overall cost of the ink and reducing environmental impact. The disclosed SMA half-ester polymer in the inkjet ink system also improves bleed and halo performance when printing against dye based color inks. Lastly, the superior performance of the disclosed ink system allows reduction or elimination of reactive agents in the color inks thereby improving the environmental impact of the product and color ink formulation flexibility.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ink comprising:
    a jettable vehicle;
    a self-dispersed pigment in said jettable vehicle; and
    a half-ester of styrene maleic anhydride (SMA) dispersed in said jettable vehicle, wherein said half-ester of SMA comprises between approximately 0.05% to approximately 10.0% by weight of said ink.

2. A set of differently colored dye based inks in which one of the set of inks comprises the ink of claim 1.

3. The ink of claim 1, wherein said half-ester of SMA has the structure

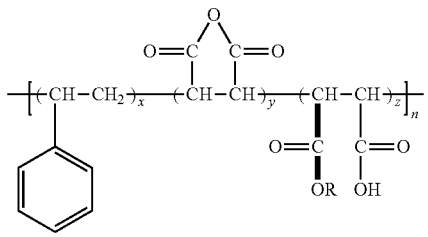

wherein x is from 1 to 25;
y is from 0.1 to 9;
z is from 0.1 to 9;
n is from 1 to 25; and
R is an alkyl, phenyl, alkyl-substituted phenyl, cycloalkyl, ether, butyoxyethyl or propyl group or mixtures thereof.

4. The ink of claim 3, wherein x is from 2 to 10; y is from 0.1 to 2; z is from 0.1 to 2; and n is from 2 to 10.

5. The ink of claim 1, further comprising a counterion configured to form a salt with said half-ester of SMA.

6. The ink of claim 5, wherein said counterion comprises one of a sodium ion, a potassium ion, a lithium ion, a rubidium ion, a cesium ion, or an ammonium ion.

7. The ink of claim 1, wherein said half-ester of SMA comprises between approximately 0.10% to approximately 5.0% by weight of said ink.

8. The ink of claim 1, wherein said jettable vehicle comprises:
    an organic co-solvent;
    a surfactant; and
    a buffer.

9. A system for printing images on a substrate comprising:
    a jettable ink; and
    a printhead loaded with the jettable ink;
    wherein the jettable ink includes a jettable vehicle, a self-dispersed pigment in the jettable vehicle, and a half-ester of styrene maleic anhydride (SMA), separate from particles of said pigment, dispersed in the jettable vehicle, wherein said half-ester of SMA comprises between approximately 0.05% to approximately 10.0% by weight of said ink.

10. The system of claim 9, wherein said printhead comprises an inkjet printhead.

11. The system of claim 10, wherein said printhead comprises a thermal inkjet printhead.

12. The system of claim 9, wherein said jettable ink further comprising a set of dye based inks.

13. The system of claim 9, wherein said half-ester of SMA has the structure

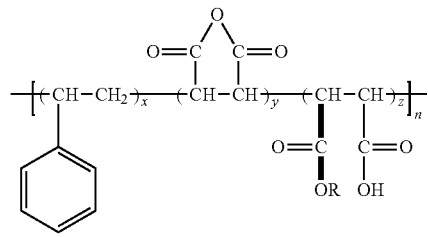

wherein x is from 1 to 25;
y is from 0.1 to 9;
z is from 0.1 to 9;
n is from 1 to 25;
R is an alkyl, phenyl, alkyl-substituted phenyl, cycloalkyl, or an ether group.

14. The system of claim 13, wherein x is from 2 to 10; y is from 0.1 to 2; z is from 0.1 to 2; and n is from 2 to 10.

15. The system of claim 9, wherein said jettable ink further comprising a counterion configured to form a salt with said half-ester of SMA.

16. The system of claim 15, wherein said counterion comprises one of a sodium ion, a potassium ion, a lithium ion, a rubidium ion, a cesium ion, or an ammonium ion.

17. The system of claim 9, wherein said half-ester of SMA comprises from approximately 0.10% to approximately 5.0% by weight of said jettable ink.

18. A system for printing images comprising:
    a means for forming an image on a medium; and
    a means for selectively dispensing said means for forming an image;
    wherein said means for forming an image includes a jettable vehicle, a self-dispersed pigment in the jettable vehicle, and a half-ester of styrene maleic anhydride (SMA), separate from particles of said pigment, dispersed in the jettable vehicle, wherein said half-ester of SMA comprises between approximately 0.05% to approximately 10.0% by weight of said ink.

19. The system of claim 18, wherein said selective dispensing means comprises an inkjet printhead.

20. The system of claim 19, wherein said printhead comprises a thermal inkjet printhead.

21. The system of claim 18, wherein said image forming means further comprising a set of dye based inks.

22. The system of claim 18, wherein said half-ester of SMA has the structure

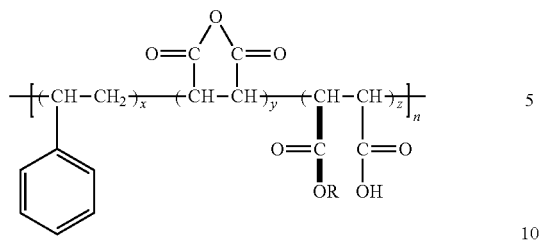

wherein x is from 1 to 25;
y is from 0.1 to 9;
z is from 0.1 to 9;
n is from 1 to 25; and
R is from an alkyl, phenyl, alkyl-substituted phenyl, cycloalkyl, or an ether group.

23. The system of claim 22, wherein x is from 2 to 10; y is from 0.1 to 2; z is from 0.1 to 2; and n is from 2 to 10.

24. The system of claim 18, wherein said image forming means further comprises a counterion configured to form a salt with said half-ester of SMA.

25. The system of claim 24, wherein said counterion comprises one of a sodium ion, a potassium ion, a lithium ion, a rubidium ion, a cesium ion, or an ammonium ion.

26. The system of claim 18, wherein said half-ester of SMA comprises from approximately 0.10% to approximately 5.0% by weight of said image forming means.

27. The ink of claim 1, wherein said half-ester of styrene maleic anhydride (SMA) dispersed in said vehicle is separate from particles of said pigment.

* * * * *